April 13, 1954  H. G. DOSTER  2,674,903
VALVE ACTUATING MECHANISM
Filed Oct. 10, 1952  2 Sheets-Sheet 1

INVENTOR
Howard T. Doster
BY
ATTORNEY

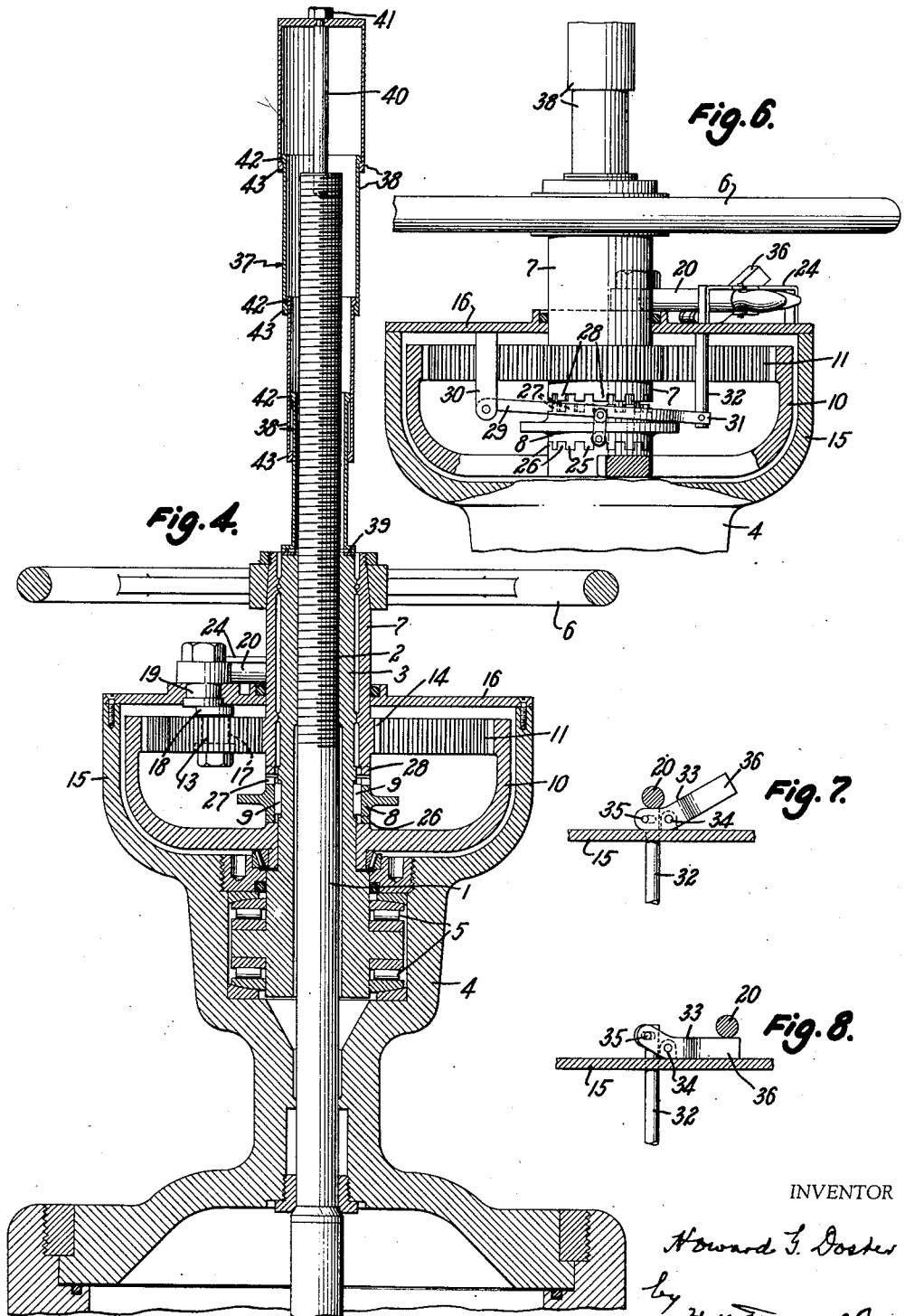

Patented Apr. 13, 1954

2,674,903

UNITED STATES PATENT OFFICE 2,674,903

VALVE ACTUATING MECHANISM

Howard G. Doster, Wadsworth, Ohio, assignor to
The Ohio Injector Company, Wadsworth, Ohio,
a corporation of Ohio Application October 10, 1952, Serial No. 314,085

5 Claims. (Cl. 74—508)

This invention relates to valves, and it has special reference to mechanism for actuating the stems of valves whereby opening and closing movements may readily be imparted to the valve member, particularly in gate valves of relatively large sizes where final closing and initial opening movements require a maximum of effort; and the invention is especially adaptable where the valve stem is manually operated, although it may also be advantageously employed where power actuated stem operating means are provided.

In the opening and closing of valves, particularly gate valves of large size, the operation of the stem to impart movement to the valve member or gate presents no difficulty when such member is free of its seat or seats, but considerable force must be exerted upon the stem to initially move the valve member from seated condition and, conversely, to impart to it the final seating movement. In other words, whether the valve be of the rising or non-rising stem type, it has been found that movement imparted directly to the valve stem, as through the usual screwthread thereof, entails a marked increase of effort for the initial opening and final closing movements of the valve member, and the primary object of the present invention is to provide means for increasing the torque applied to the valve stem actuating means, when desired, without increasing the effort exerted by the operator.

Furthermore, where a valve of the rising stem type is installed in an exposed location, as for example in a pipe line which is exposed to the elements, it is important that the outwardly projecting portion of the valve stem be covered and thus protected against corrosion and other damage which might result from such exposure, and it is a further object of the invention to provide such protection by enclosing the projecting end of the stem in a relatively rigid cover which is capable of automatically adjusting itself to the range of movement of the stem during opening and closing of the valve.

The invention comprises a valve stem actuating mechanism including nut means mounted in axially fixed but rotative relation to the valve body and bonnet and provided with a screwthread engaging the complemental screwthread of the valve stem, and means for imparting rotation to said nut means whereby axial travel may be imparted to the stem to seat and unseat the valve member carried thereby, such rotation imparting means including mechanism for directly rotating said nut means, and reduction gearing for interposition between said nut means and rotating mechanism, and means for optionally selecting either said direct or said reduction gearing operating means for imparting rotation to said nut means, therethrough to cause axial travel of said stem; and the invention comprises, further, protecting cover means for the exposed portion of said stem, including a plurality of individually substantially rigid axially telescoping sleeve members capable of automatic axial adjustment to the exposed portion of the stem, all as will be explained hereinafter more fully and finally claimed.

In the accompanying drawings illustrating the invention, in the several figures of which like parts are similarly designated, Fig. 1 is a side elevation of a valve with the features of the invention applied thereto, Fig. 2 is a top plan view of the valve shown in Fig. 1, Fig. 3 is an enlarged sectional plan view taken on the line 3—3, Fig. 1, and showing parts of the mechanism of the invention.

Fig. 4 is a section of the mechanism taken on the line 4—4 of Fig. 5,

Fig. 6 is a sectional elevation taken on the line 6—6 of Fig. 5, and Figs. 7 and 8 are sectional elevations showing the clutch actuating means of the drive mechanism in positions for reducing gear drive and direct drive, respectively.

Figure 2:
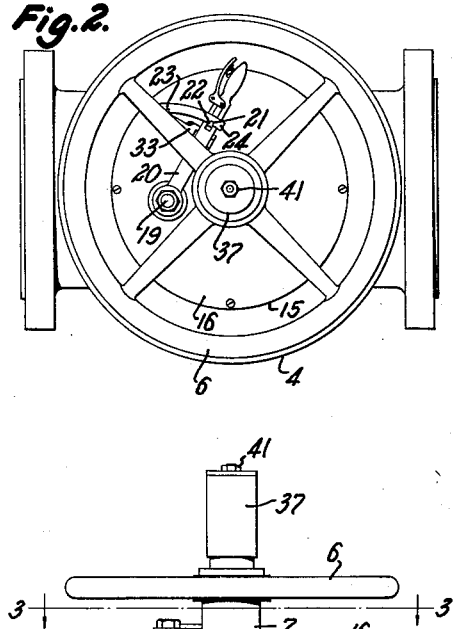
Figure 3:
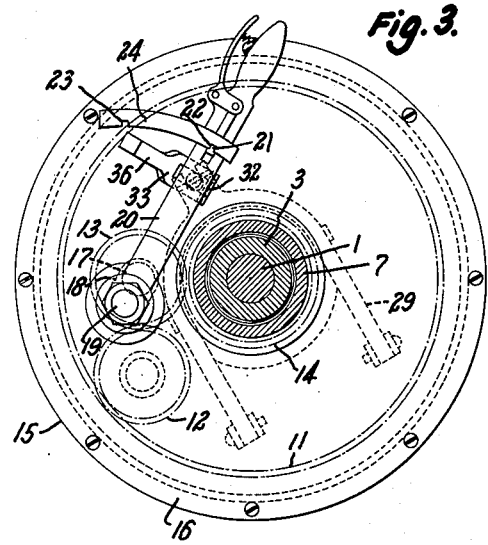
Figure 1:
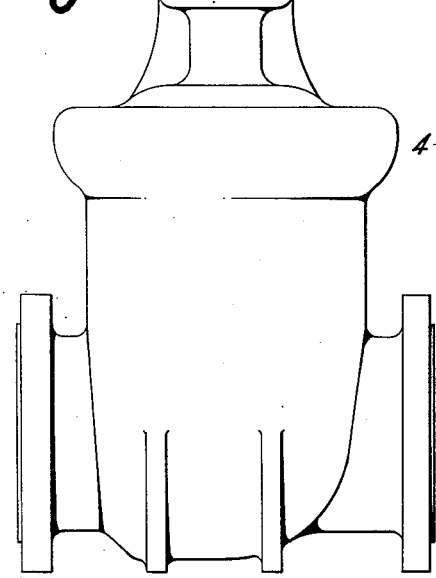

Having reference particularly to Figs. 3 to 8, inclusive, it will be seen that the valve stem 1, to which the usual gate or other valve closure member (not shown) is connected, is for the non-rotating rising stem type, and is provided with a screwthread 2 engaged by a complementally screwthreaded nut 3 fixed against axial movement in the valve bonnet 4 by combination radial and thrust bearings 5 and capable of being rotated by a hand wheel 6 carried by a sleeve 7 through the intermediary shiftable jaw clutch member 8 axially slidable on keys 9 carried by the nut 3.

Also mounted upon the nut 3 and rotatable relatively thereto is a spider 10 carrying a ring gear 11 in constant meshing engagement with an idler pinion 12 which, through a shiftable driving pinion 13 may be coupled in driving engagement with a gear 14 preferably integral with the sleeve 7.

This mechanism is enclosed within a housing 15 preferably formed as an extension of the valve bonnet 4 and provided with a cover 16. The trunnion 17 of the drive pinion 13 is provided with a crank arm 18 pivoted on a stud shaft 19 journalled in the cover 16 and extending therethrough to receive an operating lever 20 whereby the drive pinion 13 may be shifted into and out of meshing engagement (as shown in full and broken lines, respectively, Fig. 5) with the gear 14 of the sleeve 7, the lever being provided with a latch 21 which may be engaged with one or the other of two spaced notches 22 and 23 of a guide bar 24 to insure maintenance of these positions, respectively, of the drive gear 13.

Figure 5:
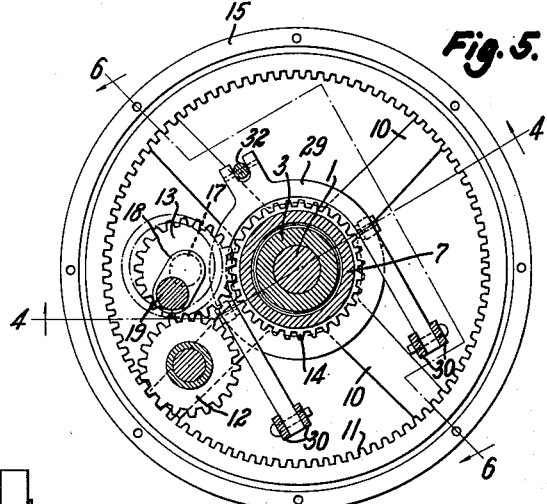
Fig. 5 is a sectional plan view similar to Fig. 3, but with the cover of the gear enclosure removed.

As shown particularly in Figs. 5 and 6, the drive mechanism for the nut 3 is so designed that when the jaws 25 of the clutch member 8 are engaged with the complemental jaws 26 of the spider 10 the nut 3 may be rotated by the keyed connection 9 of the clutch member 8 therewith through the speed reduction gearing including the gear 14 on the sleeve 7, the meshing pinions 13 and 12, and the ring gear 11, and when the jaws 27 of the clutch member 8 are engaged with the complemental jaws 28 of the sleeve 7 the nut 3 will be directly connected with the sleeve 7 for rotation therewith.

In order that proper shifting of the jaw clutch member 8 may be automatically performed in response to selection of the desired speed at which the nut 3 is to be rotated, whether in direct response to rotation of the hand wheel 6 or the like, or through the speed reduction gearing, means are provided for shifting the said clutch member 8 in response to movement of the lever 20 to engage or disengage the driving pinion 13 with respect to the driven pinion or gear 14 of the sleeve 7. These means include a shifter yoke 29 having its arms journalled in fixed pivots 30 carried by the cover 16 of the housing 14, and its free end 31 pivotally attached to the lower end of a rod 32 axially shiftable in a slide bearing in the cover 16 by means of a rock lever 33 pivoted at 34 on the cover 16 and having one end pivoted at 35 to the end of the rod 32 and its other end 36 forming a camming surface for engagement by the lever 20. Thus, having reference particularly to Figs. 7 and 8, when the lever 20 is in the position of Figs. 1 to 7, the lever 20 will hold the end at 35 of the rock lever 33, and hence the rod 32, depressed so that the complemental clutch jaws 25 and 26 will be engaged and the reduction gearing activated, this arrangement of the parts being maintained by engagement of the lever latch 21 with the retaining notch 22. When, however, it is desired to turn the nut 3 by direct action of the hand wheel 6, the lever 20 is shifted to the position where its latch 21 engages the retaining notch 23, whereupon the lever 20 will depress the cam end 36 of the rock lever 33 (Fig. 8), thus raising the rod 32 to shift the clutch member 8 for engagement of its jaws 27 with the jaws 28 of the sleeve 7. Also, due to this shifting of the lever 20 the driving pinion 13 will be disengaged from the gear 14 on the sleeve 7, as indicated by the broken lines, Fig. 5.

Obviously, therefore, the nut 3 may be freely and rapidly rotated by its direct connection through the clutch means 27—28 with the sleeve 7 and hand wheel 6, and the valve closure member or gate rapidly raised or lowered by the stem 1 through that range of its movement where no appreciable resistance is present. However, where resistance to movement of the closure member or gate is encountered, as at final seating or initial unseating, the torque exerted upon the nut 3 through rotation of the hand wheel 6 may be augmented by employment of the reduction gearing.

As hereinbefore mentioned, in the case of valves of the rising stem type, such as that shown, especially where they are installed in exposed locations, it is important that the protruding end of the stem, especially its screwthreaded portion, be protected against injury. To this end a telescopic tubular member 37 is provided for encasing the exposed portion of the stem. This member comprises a plurality of telescoping elements or sleeves 38 the lowermost of which may be rotatively secured to the nut 3, as indicated at 39, and the uppermost of which is suitably attached to the stem 1 as by a rod 40 and nut 41 connection. The elements 38 are provided with mating flanges 42—43 which may be provided with suitable packing means (not shown) and these flanges provide means which will serve not only to cause progressive extension of the elements 38 of the telescopic member 37 but serve also to provide sealing means for the exclusion from the interior of the member of anything which might attack the valve stem no matter what the extent of its projection beyond the nut 3 may be.

Various changes and modifications are considered to be within the principle of the invention and the scope of the following claims.

What I claim is:

1. Valve stem actuating means, including, in combination with a screwthreaded valve stem, screwthreaded nut means engaging said stem and held against movement axially of said stem, and means for rotating said nut means clockwise and counterclockwise to impart axial reciprocation to said stem, including power applying means, and shiftable gear means interposed between said nut means and power applying means, said gear means being provided with manually operable means for their activation and deactivation at the will of the operator, whereby the torque applied to said nut means may be varied.

2. Valve stem actuating means as claimed in claim 1, in which the torque varying means include a reduction gearing train having terminal elements affording a driving connection between said nut means and said power applying means.

3. Valve stem actuating means as claimed in claim 1, in which the torque varying means include a drive member directly connected with the power applying means, a reduction gear train, and clutch means including a clutch member shiftable axially of the nut means and with which the nut means are rotatable, means for manually shifting said clutch member, and separate clutch members associated with said drive member and said gear train, respectively, said last named clutch members being optionally engaged by the clutch member of said nut means by axial shifting of the latter.

4. Valve means actuating means as claimed in claim 1, in which the torque varying means include a sleeve and spider means rotatably journalled on said nut means in spaced axial relation, means for rotating said sleeve, a reduction gear train including a ring gear on said spider and a gear on said sleeve and an intermediate gear shiftable to establish and interrupt driving relation between said ring gear and the gear on said sleeve, and clutch means including a clutch member carried by and rotatable with said nut means and complemental clutch members carried by said sleeve and spider means respectively and optionally engageable with the clutch member of said nut means, whereby rotation may be imparted to said nut means directly through rotation of said sleeve or indirectly by way of said gear train through rotation of said sleeve.

5. Valve stem actuating means as claimed in claim 4, and including clutch shifter means, and shifter means for said intermediate gear, said two shifter means being operatively interrelated, whereby when the clutch members of said sleeve and nut means are engaged said gear train will be deactivated, and when the clutch members of said spider means and nut means are engaged said gear train will be activated.

References Cited in the file of this patent

UNITED STATES PATENTS

| Number | Name | Date |
|---|---|---|
| 1,737,612 | O'Connor | Dec. 3, 1929 |
| 2,150,813 | Ball | Mar. 14, 1939 |
| 2,351,211 | Hodgson | June 13, 1944 |
| 2,409,288 | Leland | Oct. 15, 1946 |

FOREIGN PATENTS

| Number | Country | Date |
|---|---|---|
| 301,885 | Germany | Nov. 8, 1917 |